US009925846B2

(12) United States Patent
Flanagan

(10) Patent No.: US 9,925,846 B2
(45) Date of Patent: Mar. 27, 2018

(54) METHOD OF USING A GLASS-MOUNTED HUMIDITY/TEMPERATURE SENSOR IN A VEHICLE TO OBTAIN SUN LOAD AND CONTROL OF HVAC SYSTEM USING SUN LOAD

(71) Applicant: Allan W Flanagan, Windsor (CA)

(72) Inventor: Allan W Flanagan, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 252 days.

(21) Appl. No.: 14/702,032

(22) Filed: May 1, 2015

(65) Prior Publication Data

US 2016/0318369 A1 Nov. 3, 2016

(51) Int. Cl.
*B60H 3/02* (2006.01)
*B60H 1/00* (2006.01)

(52) U.S. Cl.
CPC ....... *B60H 1/0075* (2013.01); *B60H 1/00785* (2013.01); *B60H 1/00792* (2013.01); *B60H 1/00878* (2013.01); *B60H 3/02* (2013.01)

(58) Field of Classification Search
CPC .... B60H 2001/3244; B60H 2001/3245; B60H 2001/3258; F24F 2011/0049
USPC ........................................................ 62/176.6
See application file for complete search history.

(56) References Cited

U.S. PATENT DOCUMENTS

| | | | | |
|---|---|---|---|---|
| 5,995,880 A * | 11/1999 | Larramendy | ........ | G05D 1/0623 244/181 |
| 5,995,889 A * | 11/1999 | Eisenhour | .......... | B60H 1/00735 165/202 |
| 6,186,883 B1 * | 2/2001 | Baker | ................ | B60H 1/00735 237/2 A |
| 8,015,833 B2 | 9/2011 | Cikanek et al. | | |
| 2004/0103675 A1 | 6/2004 | Tomita | | |
| 2005/0126773 A1 * | 6/2005 | Hashimoto | .......... | B60H 1/0075 165/204 |
| 2007/0131782 A1 | 6/2007 | Ziehr et al. | | |
| 2007/0235549 A1 * | 10/2007 | Nakajima | .......... | B60H 1/00785 236/44 R |

(Continued)

FOREIGN PATENT DOCUMENTS

DE     19907401 A1     8/2000

OTHER PUBLICATIONS

International Search Report and Written Opinion dated Jul. 21, 2016 for International Application No. PCT/US2016/029490, International Filing Date Apr. 27, 2016.

*Primary Examiner* — David Teitelbaum
*Assistant Examiner* — Paul Schwarzenberg
(74) *Attorney, Agent, or Firm* — Ralph E Smith

(57) ABSTRACT

Sun load on a cabin of a vehicle is determined without a sun load sensor by affixing a relative humidity/temperature sensor to an inside of a windshield of the vehicle. The relative humidity/temperature sensor includes a relative humidity sensor that senses relative humidity of air at the relative humidity sensor, a temperature sensor that senses temperature of the air at the relative humidity sensor and a glass temperature sensor that senses temperature of glass of the windshield. A controller determines the sun load based on readings from the relative humidity/temperature sensor of relative humidity of the air at the relative humidity sensor, temperature of the air at the relative humidity sensor and temperature of the glass of the windshield.

2 Claims, 3 Drawing Sheets

(56) References Cited

U.S. PATENT DOCUMENTS

2011/0284202 A1* 11/2011 Hirai .................. B60H 1/00742
165/287

* cited by examiner

METHOD OF USING A GLASS-MOUNTED HUMIDITY/TEMPERATURE SENSOR IN A VEHICLE TO OBTAIN SUN LOAD AND CONTROL OF HVAC SYSTEM USING SUN LOAD

FIELD

The present disclosure relates to a glass-mounted relative humidity/temperature sensor in a vehicle and more particularly to a method of using it to obtain sun load.

BACKGROUND

For fuel economy reasons, automotive vehicles are being equipped with humidity/fog sensors. The type of sensor typically being used has a humidity sensor and often two temperature sensors and will be referred to herein as relative humidity/temperature sensor. One temperature sensor is located adjacent the relative humidity sensor and senses temperature of the air at the relative humidity sensor, that is, the air of which the relative humidity is being sensed by relative humidity sensor. The other temperature sensor is located so that it abuts a surface on which the relative humidity/temperature sensor is mounted, such as glass of a windshield. The relative humidity/temperature sensor is located in the vehicle so that it measures relative humidity and the temperature of the air the relative humidity of which is being sensed by the relative humidity sensor. As such, this type of sensor can also be used to sense the dew point of the air in the cabin. For example, the dew point of the air in the cabin can be calculated using the relative humidity and temperature readings obtained from the sensor. In normal operation, when sensing humidity, the temperature sensor senses a temperature that is between an average temperature of the cabin air and a temperature of exterior air outside the vehicle. When the relative humidity/temperature sensor is attached to an interior surface of a windshield of the vehicle, the glass temperature sensor senses the temperature of the glass of the windshield.

In heating, ventilation, air-conditioning (HVAC) systems in vehicles having automatic temperature control, the temperature of the air in the vehicle cabin, referred to herein as cabin air temperature, and the outside air temperature are typically used as inputs to a controller of the HVAC system that is configured to control it. In some cases, a sun load on the vehicle cabin is also used as an input to the controller. Heretofore, a sun load sensor has been used to provide this input. The controller is configured to use the input from the sun load to take into account a sun load on occupants of the vehicle and adjust the HVAC automatic temperature control accordingly. For example, the controller is configured to increase cooling when the sun load on vehicle occupants is higher and decrease cooling, or even change to heating, when sun loads are lower. To increase cooling due to a higher sun load, the controller is configured to increase the speed of a blower of the HVAC system, change temperature doors in the HVAC system to deliver colder air, and/or change the HVAC mode from a heating mode to a cooling mode. The amount that the controller is configured to increase cooling is based on the level of the sun load on the vehicle occupants—the higher the sun load the greater the increase in cooling.

SUMMARY

In accordance with an aspect of the present disclosure, sun load on a cabin of a vehicle is determined without a sun load sensor by affixing a relative humidity/temperature sensor to an inside of a windshield of the vehicle wherein the relative humidity/temperature sensor includes a relative humidity sensor that senses relative humidity of air at the relative humidity sensor, a temperature sensor that senses temperature of the air at the relative humidity sensor and a glass temperature sensor that senses temperature of glass of the windshield. A controller determines the sun load based on readings from the relative humidity/temperature sensor of relative humidity of the air at the relative humidity sensor, temperature of the air at the relative humidity sensor and temperature of the glass of the windshield.

In accordance with an aspect, determining the sun load includes also using a cabin air temperature sensed by a cabin air temperature sensor and an outside air temperature sensed by an outside air temperature in determining the sun load.

In accordance with an aspect, determining the sun load includes determining it with the equation: Sun Load=$C_1$*(RH Glass Temp)+$C_2$*(RH Air Temp)+$C_3$*(RH %)+$C_4$*(Outside Temp)+$C_5$*(Cabin Temp)+$C_6$; where Sun Load is in $W/m^2$, Outside Temp is the outside temperature in degrees Celsius sensed by the outside temperature sensor, RH % is relative humidity percentage sensed by the relative humidity sensor of the relative humidity/temperature sensor and is an integer between 0 and 100, RH Air Temp is the temperature in degrees Celsius of air at the relative humidity sensor sensed by the air temperature sensor of the relative humidity/temperature sensor, RH Glass Temp is the temperature in degrees Celsius of the windshield glass sensed by the glass temperature sensor of the relative humidity/temperature sensor, Cabin Temp is the temperature in degrees Celsius of air in the vehicle cabin sensed by the cabin air temperature sensor, and Outside Temp is the temperature in degrees Celsius of the outside air sensed by outside temperature sensor. $C_1$-$C_6$ are constants for a particular vehicle and the particular sensors used on the vehicle, and are illustratively determined heuristically for the particular vehicle.

In accordance with an aspect, a method of controlling an HVAC system of a vehicle includes adjusting with the controller automatic temperature control settings for the HVAC system based on the sun load and controlling the HVAC system with the controller with the adjusted automatic temperature control settings.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

In accordance with an aspect of the present disclosure, a relative humidity/temperature sensor is disposed on an interior surface of a windshield of an automotive vehicle, such as a front windshield. During a period of high sun load, the temperature sensed by the temperature sensor of the relative humidity/temperature sensor can be higher than the temperature of the air inside the cabin of the vehicle and also the temperature of the exterior air. Applicant has found that this temperature correlates to a filtered sun load and in accordance with an aspect of the present disclosure, this temperature is used to determine a sun load on the vehicle cabin and thus the sun load on occupants in the vehicle. This sun load is then used as an input parameter in the control the HVAC (heating, ventilation, air-conditioning) system of the vehicle. In accordance with an aspect of the present disclosure, the relative humidity/temperature sensor is used in obtaining a sun load on the vehicle cabin that is then used as a sun load input in the control of the vehicle HVAC system. In an aspect, the sun load is used as an input in automatic temperature control of the vehicle HVAC system, and in an aspect, to modify the amount of cooling determined by the automatic temperature control of the HVAC system. Thus, in accordance with these aspects of the disclosure, a sun load for use as an input in the automatic temperature control of the vehicle HVAC system can be obtained by using the relative humidity/temperature sensor and without the use of a separate sun load sensor.

Figure 1:
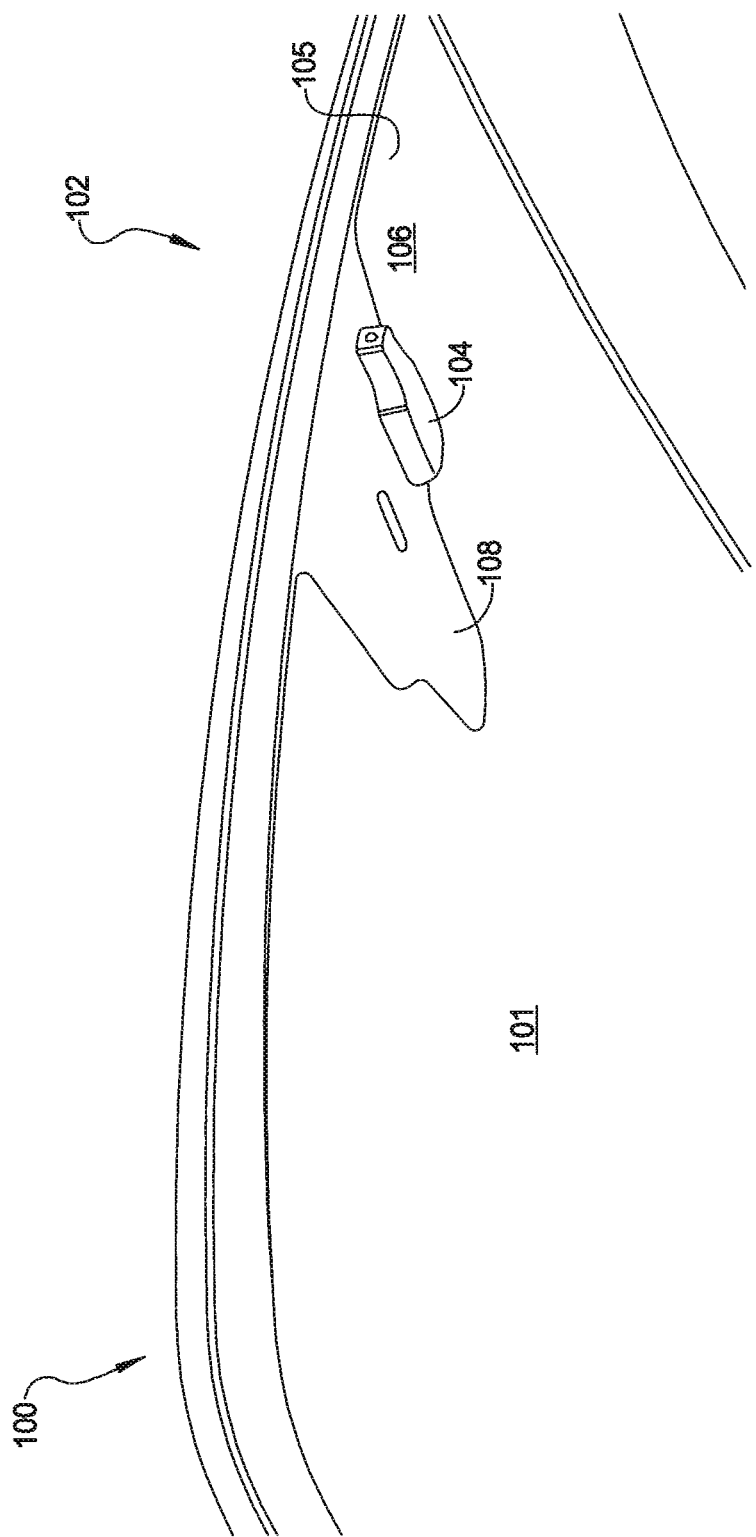
FIG. 1 is a view of prior art showing a vehicle windshield having a relative humidity/temperature affixed thereto.
Figure 2:
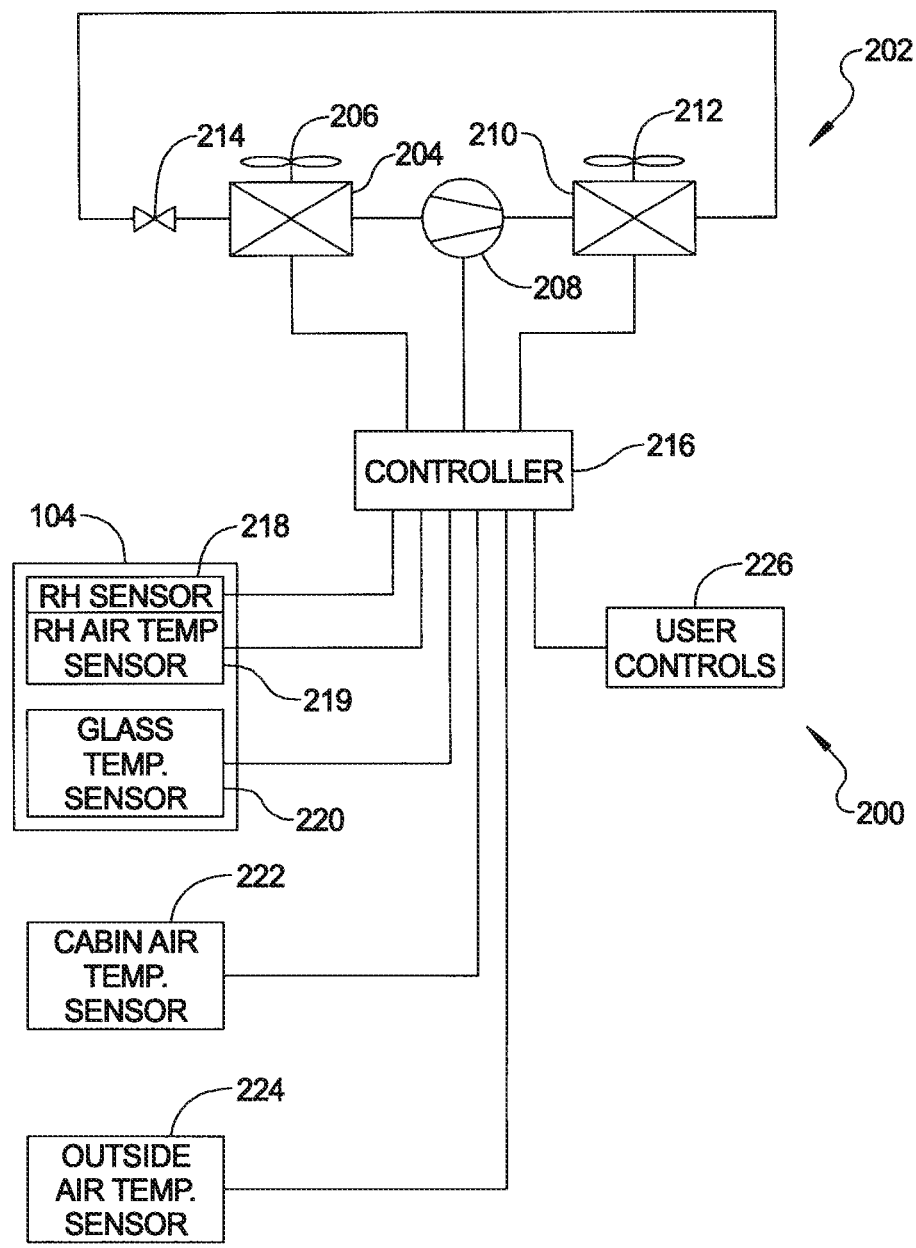
FIG. 2 is a basic block diagram of a HVAC system for a vehicle having a controller that utilizes readings from the relative humidity/temperature sensor of FIG. 1 to determine a sun load on a cabin of the vehicle in accordance with an aspect of the present disclosure.

FIG. 1 shows a windshield 100 of a vehicle 102 having a relative humidity/temperature sensor 104 attached to an inside 105 of glass 106 of windshield 100. FIG. 2 is a basic block diagram of heating, ventilation, air-conditioning system (HVAC) 200 for a vehicle having a direct expansion (DX) cooling circuit 202. DX cooling circuit 202 includes an evaporator 204 having an evaporator fan 206 (typically referred to as a blower in a vehicle HVAC system such as HVAC system 200), a compressor 208, a condenser 210 having a condenser fan 212 (typically a radiator fan of the vehicle) and a direct expansion valve 214 coupled together in a DX cooling circuit. DX cooling circuit 202 is controlled by a controller 216 that is coupled to the components of DX cooling circuit to be controlled, such as evaporator 206, compressor 208 and condenser 212.

Relative humidity/temperature sensor 104 includes a relative humidity sensor 218, a relative humidity air temperature sensor 219 and a glass temperature sensor 220 that are coupled to inputs of controller 216. An example of such a relative humidity/temperature sensor 104, which is a prior art relative humidity/temperature sensor, is a relative humidity/temperature sensor having part number 55111389AF used on certain vehicles manufactured by FCA US LLC having a place of business in Auburn Hills, Mich. and available from its Mopar® parts division. Relative humidity/temperature sensor 104 is attached to the inside 105 of windshield 100, for example, adjacent a rear view mirror 108 (FIG. 1) attached to windshield 100. Relative humidity sensor 218 and relative humidity air temperature sensor 219 are located in proximity to each other so that relative humidity air temperature sensor 219 senses the temperature of the air at relative humidity sensor 218 and of which relative humidity sensor 218 is sensing the relative humidity. Glass temperature sensor 220 abuts the interior of windshield 100 and senses the temperature of the glass 106 of windshield 100. A cabin air temperature sensor 222 is also coupled to an input of controller 216 and senses temperature of air in a cabin 101 of the vehicle 102. An outside air temperature sensor 224 is also coupled to an input of controller 216 and senses outside air temperature. It should be understood that cabin air temperature sensor 222 and outside air temperature sensor 224 are typical temperature sensors installed in a vehicle. User controls 226 are also coupled to an input (or inputs) of controller. User controls 226 are used by a user of a vehicle, such as a driver, to set or adjust the operation of HVAC system 200, such as a desired cabin air temperature, blower speed, or the like depending on the type of HVAC system 200. In an aspect described below, HVAC system 200 has automatic temperature control wherein a user can set a desired cabin air temperature using user controls 226 and controller 216 controls HVAC system 200 to maintain the desired cabin air temperature.

Controller 216 illustratively controls HVAC system 200 in known fashion (including controlling DX cooling circuit 202) based on inputs from user controls 226, the outside temperature sensed by outside temperature sensor 224, the cabin air temperature sensed by cabin air temperature sensor 222 and sun load. However, in contrast with the prior art where a sun load sensor is used to sense sun load, the sun load is determined using the relative humidity sensed by relative humidity sensor 218 of relative humidity/temperature sensor 104, temperature of the air at relative humidity sensor 218 sensed by temperature sensor 219 of relative humidity sensor 104 and temperature of glass 106 of windshield 100 sensed by glass temperature sensor 220 of relative humidity sensor 104. In an aspect, vehicle cabin air temperature sensed by cabin air temperature sensor 222 and outside air temperature sensed by outside air temperature sensor 224 are also used in determining the sun load. In an aspect, controller 216 is configured to determine the sun load. The following is an example equation that controller 216 is configured to implement to determine sun load: Sun Load=$C_1$*(RH Glass Temp)+$C_2$*(RH Air Temp)+$C_3$*(RH %)+$C_4$*(Outside Temp)+$C_5$*(Cabin Temp)+C6. In the foregoing, Sun Load is in W/m$^2$, Outside Temp is the outside temperature in degrees Celsius sensed by the outside temperature sensor, RH % is relative humidity percentage sensed by the relative humidity sensor and is an integer between 0 and 100, RH Air Temp is the temperature in degrees Celsius of air at the relative humidity sensor sensed by the air temperature sensor of the relative humidity/temperature sensor, RH Glass Temp is the temperature in degrees Celsius of the windshield glass sensed by the glass temperature sensor of the relative humidity/temperature sensor, Cabin Temp is the temperature in degrees Celsius of air in the vehicle cabin sensed by the cabin air temperature sensor, and Outside Temp is the temperature in degrees Celsius of the outside air sensed by outside temperature sensor. $C_1$-$C_6$ are constants for a particular vehicle and the particular sensors used on the vehicle, and are illustratively determined heuristically for the particular vehicle. For example, for a model year 2015 Fiat 500 vehicle, $C_1$=8.9243, $C_2$=8.2355, $C_3$=1.2478, $C_4$=−4.9692, $C_5$=−3.5908 and $C_6$=−166.32.

Figure 3:
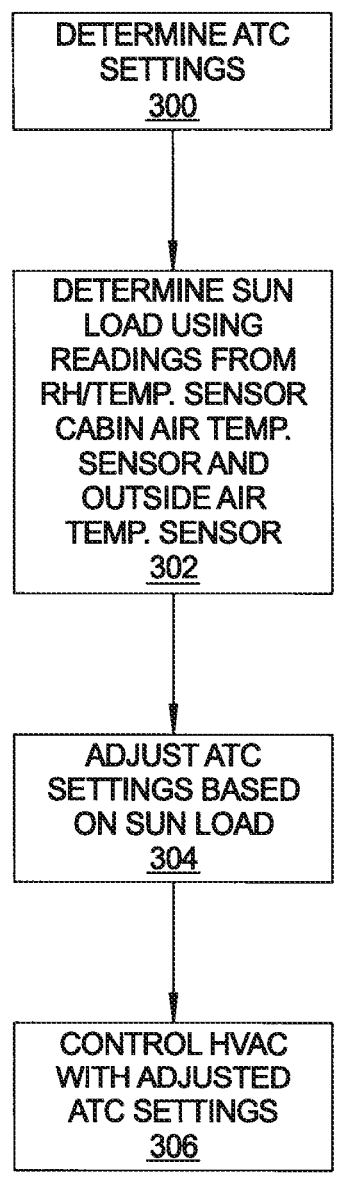
FIG. 3 is a flow chart of a control routine for the control of the HVAC system of FIG. 2 in accordance with an aspect of the present disclosure.

FIG. 3 is a simple flow chart of a control routine for controlling HVAC system 200 that controller 216 is configured to implement, such as by being programmed with software implementing the routine. At 300, controller 216 determines automatic temperature control settings for HVAC system 200, such as based on cabin air temperature sensed by cabin temperature sensor 222, outside temperature sensed by outside temperature sensor 224 and user input via user controls 226. At 302, controller 216 determines a sun load using readings from relative humidity/temperature sensor 104, cabin air temperature sensor 222 and outside temperature sensor 224, such as with the equation set forth above. At 304, controller 216 modifies the automatic temperature control settings based on the determined sun load. At 306, controller 216 controls HVAC system 200 using the adjusted automatic temperature control settings.

It should be understood that controller 216 may be, be part of, or include an Application Specific Integrated Circuit (ASIC); an electronic circuit; a combinational logic circuit; a field programmable gate array (FPGA); a processor (shared, dedicated, or group) that executes code; a programmable logic controller, programmable control system such as a processor based control system including a computer based control system, a process controller such as a PID controller, or other suitable hardware components that provide the described functionality or provide the above functionality when programmed with software as described herein; or a combination of some or all of the above, such as in a system-on-chip. The term module may include memory (shared, dedicated, or group) that stores code executed by the processor. The term software, as used above, may refer to computer programs, routines, functions, classes, and/or objects and may include firmware, and/or microcode. When it is stated that controller 216 performs a function such as switching power semiconductors 114, it should be understood that controller 216 is configured to do so such as by appropriate software, electronic circuit(s) including discrete and integrated logic, or combination thereof. Controller 216 may include calibratable set points.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling a HVAC system of a vehicle, comprising:

determining with a controller automatic temperature control settings for the HVAC system;

determining a sun load on a cabin of the vehicle without using a sun load sensor by using readings from a relative humidity/temperature sensor affixed to an inside of a windshield of the vehicle wherein the relative humidity/temperature sensor includes a relative humidity sensor that senses relative humidity of air at the relative humidity sensor, a temperature sensor that senses temperature of the air at the relative humidity sensor and a glass temperature sensor that senses temperature of glass of the windshield and the readings include relative humidity of the air at the relative humidity sensor, temperature of the air the relative humidity sensor and temperature of glass of the windshield;

wherein determining the sun load includes also using a cabin air temperature sensed by a cabin air temperature sensor and an outside air temperature sensed by an outside air temperature sensor in determining the sun load and determining the sun load includes determining it with the controller with the equation:

Sun Load=$C_1$*(RH Glass Temp)+$C_2$*(RH Air Temp)+$C_3$*(RH%)+$C_4$*(Outside Temp)+$C_5$*(Cabin Temp)+$C_6$; where Sun Load is in W/m$^2$, Outside Temp is the outside temperature in degrees Celsius sensed by the outside air temperature sensor, RH% is relative humidity percentage sensed by the relative humidity sensor and is an integer between 0 and 100, RH Air Temp is the temperature in degrees Celsius of air at the relative humidity sensor sensed by the air temperature sensor of the relative humidity/temperature sensor, RH Glass Temp is the temperature in degrees Celsius of the windshield glass sensed by the glass temperature sensor of the relative humidity/temperature sensor, Cabin Temp is the temperature in degrees Celsius of air in the vehicle cabin sensed by the cabin air temperature sensor, and Outside Temp is the temperature in degrees Celsius of the outside air sensed by outside air temperature sensor, and $C_1$-$C_6$ are constants for the vehicle and the sensors;

adjusting with the controller the automatic temperature control settings based on the sun load; and controlling with the controller the HVAC system using the adjusted automatic temperature control settings.

2. A method of determining sun load on a cabin of a vehicle without a sun load sensor, comprising:

affixing a relative humidity/temperature sensor to an inside of a windshield of the vehicle wherein the relative humidity/temperature sensor includes a relative humidity sensor that senses relative humidity of air at the relative humidity sensor, a temperature sensor that senses temperature of the air at the relative humidity sensor and a glass temperature sensor that senses temperature of glass of the windshield; and determining with a controller the sun load based on readings from the relative humidity/temperature sensor of relative humidity of the air at the relative humidity sensor, temperature of the air at the relative humidity sensor and temperature of the glass of the windshield, wherein determining the sun load includes also using a cabin air temperature sensed by a cabin air temperature sensor and an outside air temperature sensed by an outside air temperature in determining the sun load and determining the sun load includes determining it with the equation:

Sun Load=$C_1$*(RH Glass Temp)+$C_2$*(RH Air Temp)+$C_3$*(RH%)+$C_4$*(Outside Temp)+$C_5$*(Cabin Temp)+$C_6$; where Sun Load is in W/m$^2$, Outside Temp is the outside temperature in degrees Celsius sensed by the outside temperature sensor, RH% is relative humidity percentage sensed by the relative humidity sensor and is an integer between 0 and 100, RH Air Temp is the temperature in degrees Celsius of air at the relative humidity sensor sensed by the air temperature sensor of the relative humidity/temperature sensor, RH Glass Temp is the temperature in degrees Celsius of the windshield glass sensed by the glass temperature sensor of the relative humidity/temperature sensor, Cabin Temp is the temperature in degrees Celsius of air in the vehicle cabin sensed by the cabin air temperature sensor, and Outside Temp is the temperature in degrees Celsius of the outside air sensed by outside air temperature sensor, and $C_1$-$C_6$ are constants for the vehicle and the sensors.

* * * * *